US012544285B2

(12) United States Patent
Ko et al.

(10) Patent No.: US 12,544,285 B2
(45) Date of Patent: Feb. 10, 2026

(54) BED ROBOT APPARATUS

(71) Applicants: Young Ji Ko, Seoul (KR); Jung Soo Ko, Seoul (KR); Dae Yong Ko, Seoul (KR)

(72) Inventors: Young Ji Ko, Seoul (KR); Jung Soo Ko, Seoul (KR); Dae Yong Ko, Seoul (KR)

(73) Assignees: Young Ji Ko, Seoul (KR); Jung Soo Ko, Seoul (KR); Dae Yong Ko, Seoul (KR)

( * ) Notice: Subject to any disclaimer, the term of this patent is extended or adjusted under 35 U.S.C. 154(b) by 419 days.

(21) Appl. No.: 18/003,910

(22) PCT Filed: Jun. 29, 2021

(86) PCT No.: PCT/KR2021/008175
§ 371 (c)(1),
(2) Date: Dec. 29, 2022

(87) PCT Pub. No.: WO2022/005164
PCT Pub. Date: Jan. 6, 2022

(65) Prior Publication Data

US 2023/0255842 A1 Aug. 17, 2023

(30) Foreign Application Priority Data

Jun. 30, 2020 (KR) ........................ 10-2020-0080614

(51) Int. Cl.
*A61G 7/018* (2006.01)
*A47D 9/00* (2006.01)
(Continued)

(52) U.S. Cl.
CPC ............. *A61G 7/018* (2013.01); *A47D 9/012* (2022.08); *A61G 7/005* (2013.01); *A61G 7/008* (2013.01);
(Continued)

(58) Field of Classification Search
CPC .................................. A47B 7/00; A61G 7/14
(Continued)

(56) References Cited

U.S. PATENT DOCUMENTS 4,776,047 A * 10/1988 DiMatteo ............ A61G 7/1032
D12/132
5,390,379 A * 2/1995 Palmer, Jr. ........... A61G 7/1076
5/81.1 C
(Continued)

FOREIGN PATENT DOCUMENTS

KR 10-2017-0092640 A 8/2017
KR 10-1814093 B1 1/2018
(Continued)

OTHER PUBLICATIONS

International Search Report for PCT/KR2021/008175 by Korean Intellectual Property Office dated Oct. 12, 2021.

*Primary Examiner* — David R Hare
*Assistant Examiner* — Joseane E. Tejada
(74) *Attorney, Agent, or Firm* — BROADVIEW IP LAW, PC

(57) ABSTRACT

The present invention provides the bed robot apparatus in which a lying object, including a person such as a patient, a disabled person, etc. can be shifted to another apparatus without changing a lying state, and the apparatus autonomously communicates with another apparatus so as to collaborate depending on the situation of the object. Specifically, according to the feature of the present invention, a bed robot apparatus comprising: a mattress partitioned into positions corresponding to body parts of a user in a longitudinal direction; and a porous flexible sheet reciprocating in a lateral direction on the upper surface of the mattress for each divided upper plate is provided. The bed robot appa-
(Continued)

ratus of the present invention can autonomously execute all functions through an autonomous execution unit.

7 Claims, 20 Drawing Sheets

(51) Int. Cl.

| | |
|---|---|
| ***A61G 7/005*** | (2006.01) |
| ***A61G 7/008*** | (2006.01) |
| ***A61G 7/012*** | (2006.01) |
| ***A61G 7/015*** | (2006.01) |
| ***A61G 7/057*** | (2006.01) |
| *A01K 1/035* | (2006.01) |

(52) U.S. Cl.
CPC ............. *A61G 7/012* (2013.01); *A61G 7/015* (2013.01); *A61G 7/05784* (2016.11); *A01K 1/035* (2013.01); *A61G 2203/46* (2013.01)

(58) Field of Classification Search
USPC ...................................................... 5/608, 81.1
See application file for complete search history.

(56) References Cited

U.S. PATENT DOCUMENTS

| | | | | |
|---|---|---|---|---|
| 6,341,393 | B1 | 1/2002 | Votel | |
| 6,526,606 | B2 * | 3/2003 | Friedrich | A61G 7/008 5/81.1 R |
| 8,555,440 | B2 * | 10/2013 | Lewis | A61F 7/00 5/81.1 HS |
| 10,111,792 | B2 * | 10/2018 | Lai | A61G 7/02 |
| 2012/0304384 | A1 * | 12/2012 | Scholz | A61F 7/00 5/81.1 R |
| 2013/0309713 | A1 * | 11/2013 | Ribble | A61B 5/6892 435/34 |
| 2013/0340167 | A1 * | 12/2013 | Karwal | A61G 13/0009 5/81.1 R |

FOREIGN PATENT DOCUMENTS

| | | | |
|---|---|---|---|
| KR | 10-2019-0116733 | A | 10/2019 |
| WO | 2010/035968 | A2 | 4/2010 |
| WO | 2016/108582 | A1 | 7/2016 |

* cited by examiner (NB) OPR: OPERATION
COND: CONDITION

BED ROBOT APPARATUS

CROSS-REFERENCE TO RELATED APPLICATIONS

This application is a National Phase Entry Application of PCT Application No. PCT/KR2021/008175 filed on Jun. 29, 2021, which claims priority to Korean Patent Application No. 10-2020-0080614 filed on Jun. 30, 2020, in Korean Intellectual Property Office, the entire contents of which are hereby incorporated by reference in its entirety.

TECHNICAL FIELD

The present invention relates to mechatronics, automatic control, artificial intelligence, information and communication, or robot technology required to transform a shape of a bed and communicate with the external devices.

BACKGROUND ART

Various types of bed devices or apparatuses on which persons who has difficulty in moving around, such as patients, disabled persons, elderly persons, or infants lie or sit down are known.

An example of such a bed apparatus is disclosed in Korean Publication Patent No. 10-2019-0116733 (published on Oct. 15, 2019). In Korean Publication Patent No. 10-2019-0116733, the bed apparatus includes a frame which includes a plurality of segmental frames and is connected in a foldable manner to an adjacent segmental frame to form a tilt angle, a mattress seated on the frame, a driving unit which drives the segmental frame to be folded, and a support unit which supports a lower portion of the frame, wherein, since the driving unit is provided only in a lower area of a fixed frame and is not exposed at a lower portion of upper and lower body frames of which angles are adjusted, a risk of accidents can be reduced, and the aesthetics can be improved.

However, most conventional bed apparatuses do not adopt functions other than a function of bending a mattress to implement a state in which a patient or the like lies on a bed, a state in which the patient sits up, a state in which the patient raises his/her feet, and a state in which a patient sits down. In order to shift (move and pick up) a patient or the like to a transfer device, a caregiver or protector should lift and move the patient by himself/herself. In addition, there is a risk of infection with viruses, germs, or bacteria through face-to-face contact with patients. Moreover, there is no transfer device having a communication or cooperation function with external devices. Such problems apply not only to persons such as patients or disabled persons but also to objects such as various animals (for example, dogs, cats, lions, horses, and crocodiles) or objects such as furniture, and equipment.

DISCLOSURE

Technical Problem

The present invention is directed to providing a bed robot apparatus which is capable of, in addition to a simple function of bending a mattress, automatically, conveniently and safely shifting patients, disabled persons, various animals, and objects in a non-face-to-face manner and adopts a robot concept that utilizes technologies such as electronic control, artificial intelligence, and information technology (IT) to autonomously perform corresponding functions and perform interaction/communication with external apparatuses without depending only on manpower.

Technical Solution

In order to solve the above problems, there is provided a bed robot apparatus (hereinafter referred to as a bed robot) capable of shifting an object such as a patient, a disabled person, an elderly person, an infant, an animal, or a thing to another apparatus (for example, a shift apparatus) without a change in a lying state and autonomously communicating and collaborating with another apparatus according to a situation of the object. Here, "objects" include not only patients, disabled persons, elderly persons, and infants, but also animals such as dogs, cats, wild beasts, and crocodiles, and objects such as furniture and equipment.

According to an embodiment of the present invention, a bed robot apparatus includes a mattress partitioned in a longitudinal direction to correspond to a longitudinal position of an object (for example, a body part of a user), and a porous flexible sheet which reciprocates in a lateral direction on an upper surface of the mattress for each partitioned part.

The bed robot apparatus may further include a roller installed in the mattress to allow the porous flexible sheet to reciprocate in the lateral direction of the mattress. The robot bed apparatus may further include a part configured to adjust at least one of a height, a lateral tilt, and a longitudinal tilt of the mattress.

The bed robot apparatus of the present invention may communicate with an external environment, and an autonomous execution unit may autonomously perform functions.

Advantageous Effects

According to the present invention, in addition to a function of transforming a shape by vertically bending a mattress, it is possible to conveniently and easily perform an operation of moving a patient in a lateral direction and shifting (transfer and pick up) the patient to another bed robot or external apparatus (for example, a transfer device) and prevent bedsores of a user such as a lying patient. In addition, a communication or collaboration function with an external apparatus is provided so that a function of calling a protector or external apparatuses and a shift function can be autonomously performed. In addition, it is possible to avoid infection with viruses, germs, or bacteria through face-to-face contact with patients.

MODES OF THE INVENTION

As embodiments of the present invention, a bed robot will be described. Advantages and features of the present invention and methods of achieving them will become more apparent with reference to embodiments described in detail in conjunction with the accompanying drawings. However, the present invention is not limited to the embodiments described below. The embodiments serve only to complete the disclosure of the present invention and are provided to fully inform those of ordinary skill in the art of the scope of the present invention, and the present invention is defined by the description of the claims In the embodiments described below, a subject (object) to be shifted is assumed to be a "user" such as a patient, a disabled person, an elderly person, or an infant. Here, the word "user" is used to mean not only a patient or a disabled person, but also an ordinary person.

<Configuration and Operation of Bed Robot>

Figure 1:
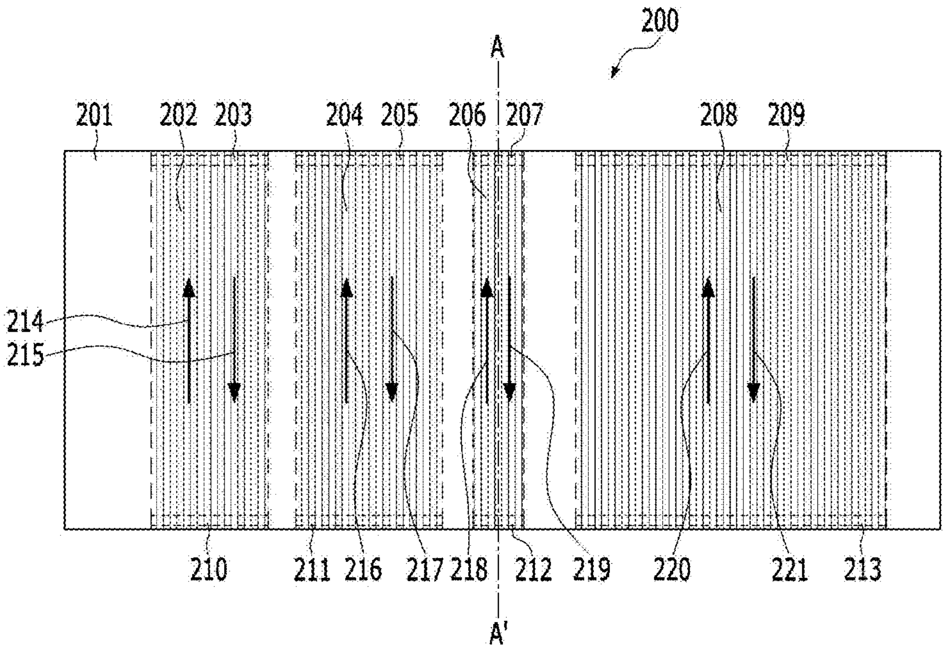
FIG. 1 is a plan view of a bed robot according to an embodiment of the present invention.
Figure 2:
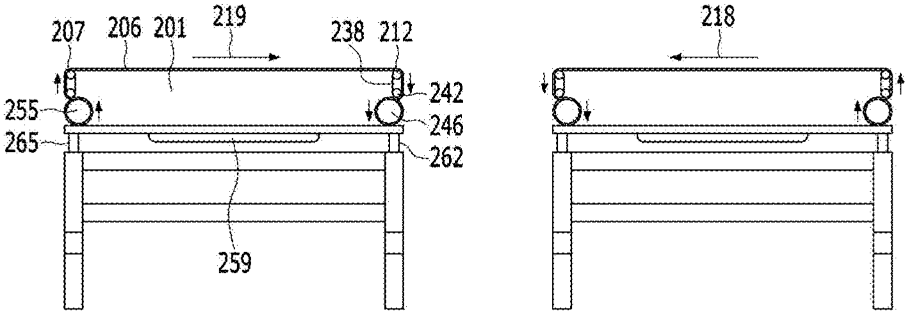
FIG. 2 is a cross-sectional view along line A-A' of FIG. 1.
Figure 3:
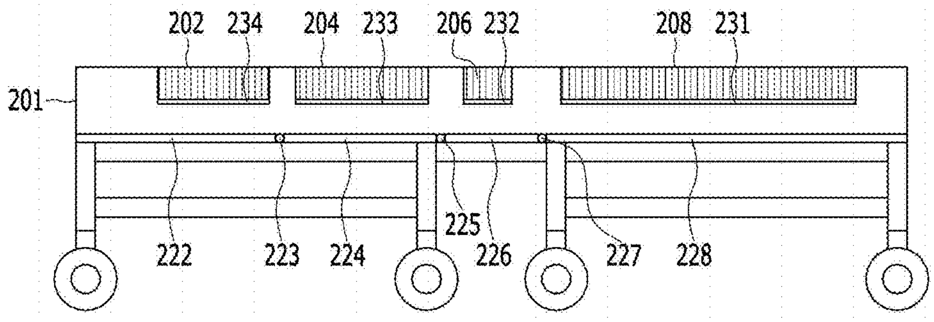
FIG. 3 is a right-side view of a basic form of the bed robot.

FIG. 1 is a plan view of a bed robot apparatus (hereinafter referred to as "bed robot 200") according to an embodiment of the present invention. FIG. 2 shows cross-sectional views along line A-A' of FIG. 1 which illustrates the bed robot 200 viewed from the front (left side in FIG. 1). FIG. 3 is a right-side view of a basic form in which an upper mattress of the bed robot 200 is flat. In the following description, the present invention will be described through an embodiment of a bed robot that can be used by a user such as a patient, a disabled person, an elderly person, or an infant.

First, a bed mattress 201 is approximately partitioned into parts in a longitudinal direction to correspond to a head, a back, a waist, a hip, and feet of a user. In FIG. 1, the bed mattress 201 is illustrated as being partitioned, for example, into four parts. Small rollers 203, 205, 207, and 209 and other small rollers 210, 211, 212, and 213 are installed in the partitioned parts along a length at first and second sides of both sides of the bed mattress 201 in a lateral direction. The rollers rotate simultaneously in the same direction. Due to the lateral rotation of the rollers, a user lying on the mattress is moved in the lateral direction. To this end, porous flexible sheets 202, 204, 206, and 208, which can be made of a porous fabric material, are laterally moved in directions of arrows 214, 216, 218, 220, and 215, 217, 219, 221 through the rolling small rollers 203, 205, 207, 209, 210, 211, 212, and 213. A lying user can be pushed sideward in the lateral direction due to friction with the porous flexible sheets and conveniently and safely shifted to another bed or transfer device.

FIG. 2 shows cross-sectional views along line A-A' of FIG. 1 which illustrate the bed robot 200 viewed from the left side in FIG. 1.

The cross-sectional view on the left illustrates that the porous flexible sheet 206 moves from left to right as indicated by an arrow 219 (the same applies to the porous flexible sheets 202, 204, and 208). To the purpose, each end of the porous flexible sheet 206 is wound on each of large rollers 255 and 246 driven by electric motors (not shown) installed under the mattress. In order to move a user in a right lateral direction indicated by the arrow 219, the large rollers 255 and 246 slowly rotate counterclockwise, thereby causing the small rollers 207 and 212 to rotate clockwise.

The cross-sectional view on the right illustrates that the porous flexible sheet 206 moves from right to left as indicated by an arrow 218. To this end, the large rollers 255 and 246, which are driven by the electric motors installed under the mattress 201 and on which both ends of the porous flexible sheet 206 are wound, slowly rotate clockwise to move a user in a left lateral direction indicated by the arrow 218.

A rotational speed of the small roller varies according to a position, a condition, or the like of a user, and the operation thereof is stopped when a dangerous situation is detected.

In addition, in order to facilitate movement of a user, the air is supplied from an air circulator 259 attached under the mattress 201 to reduce a frictional force between the porous flexible sheets 202, 204, 206, and 208 and a surface of the mattress 201 as much as possible. This will be described below.

FIG. 3 is a right-side view of a basic form in which the mattress 201 of the bed robot 200 is positioned to be flat. There is a lower frame with movable wheels attached to a lower portion thereof and which supports the mattress 201 and frames 222, 224, 226, and 228. Posture transformation frames 222, 224, 226, and 228, which are operated by pivot mechanisms 223, 225, and 227 capable of transforming a shape of the mattress, are provided on the lower frame. It can be seen that long and thin slit-shaped inlet/outlet ports 234, 233, 232, and 231 are formed in side surfaces of the mattress 201 such that the porous flexible sheets 202, 204, 206, and 208 may exit from a first side of the mattress, pass over an upper surface of the mattress, and enter a second side opposite to the first side.

Figure 4:
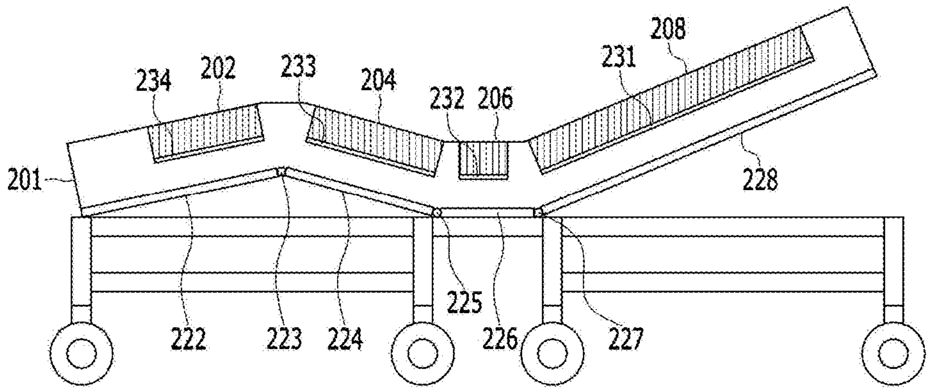
FIG. 4 is a right-side view illustrating a state in which a mattress of the bed robot is transformed.

FIG. 4 is a right-side view illustrating a state in which the mattress 201 of the bed robot of FIG. 3 is transformed as necessary. The posture transformation frames 222 and 224 are raised with respect to the pivot mechanism 223, and a right-side of the posture transformation frame 228 is raised with respect to the pivot mechanism 227. Such a transformed shape is for adjusting a position of a hip of a user and gathering the user to a middle part 206 of the mattress 201 to bring the user into close contact with the porous flexible sheet 206 for lateral movement of the user.

Figure 5:
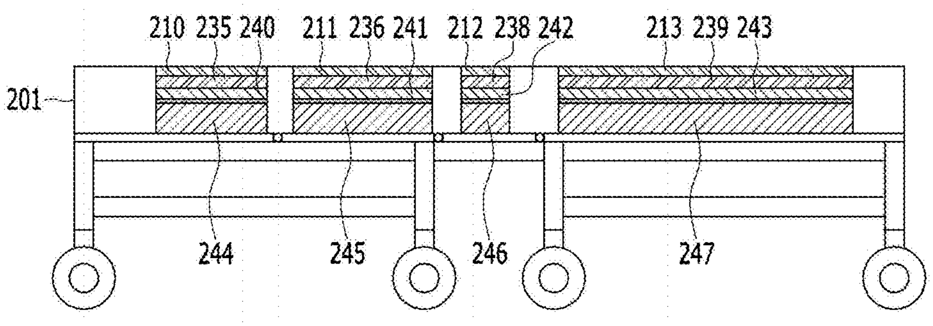
FIG. 5 is a partial cutaway cross-sectional view for viewing an internal configuration by removing porous flexible sheets (202, 204, 206, and 208) in FIG. 3.

FIG. 5 is a partial cutaway cross-sectional view for viewing an internal configuration by removing the porous flexible sheets 202, 204, 206, and 208 in FIG. 3. The small rollers 210, 211, 212, and 213 are at an upper side attached to the mattress 201, and there are small rollers 240, 241, 242, and 243 at a middle side, coupling mechanisms 235, 236, 238, and 239 for vertically connecting the small rollers 210, 240, 211, 241, 212, 242, 213, and 243, and large rollers 244, 245, 246, and 247 for driving use which are driven by the electric motors (not shown) installed under the mattress 201 and on which the porous flexible sheets are wound.

Figure 6:
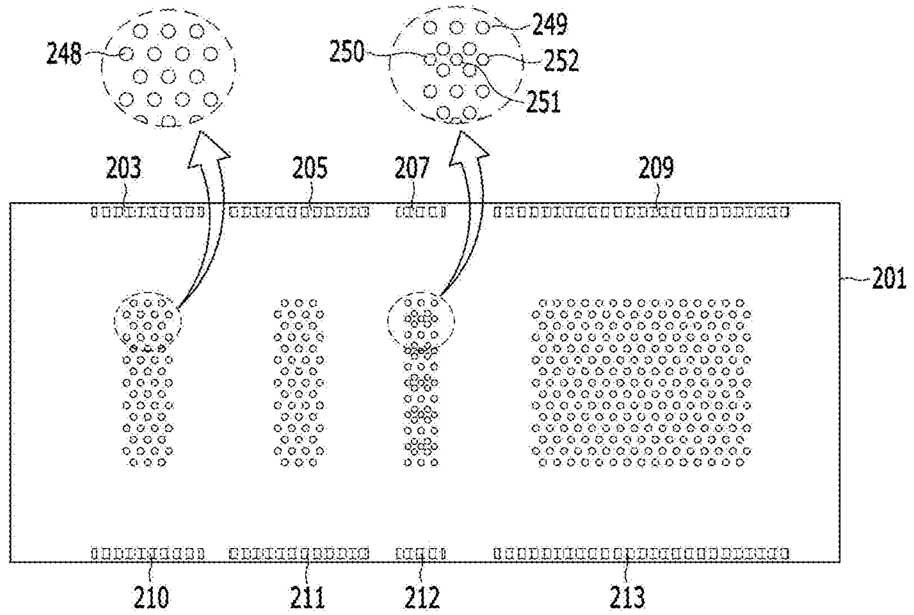
FIG. 6 is a plan view of a mattress (201) after the porous flexible sheets are removed from the bed robot.

FIG. 6 is a plan view of the mattress 201 after the porous flexible sheet is removed from the bed robot. A plurality of holes 248 and 249 are perforated in the mattress 201 directly below the porous flexible sheets 202, 204, 206, and 208 of the mattress. An odor sensor 250, a temperature sensor 251, and a humidity sensor 252 are installed in some of the holes.

The small rollers 203, 205, 207, 209, 210, 211, 212, and 213 on which the porous flexible sheets roll are seen at edges of the mattress 201.

Figure 7:
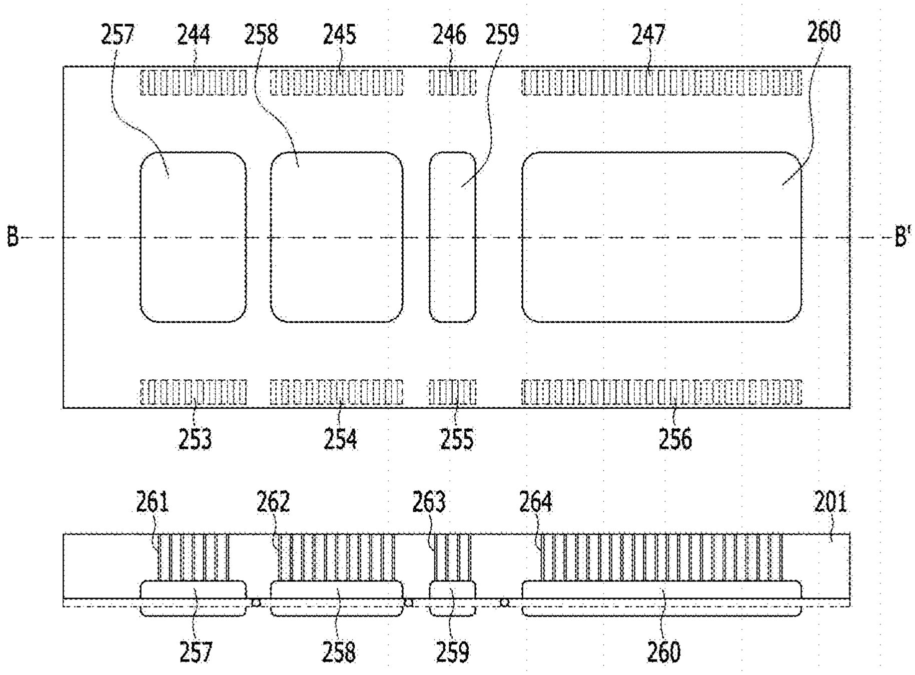
FIG. 7 is a plan view of the mattress of the bed robot (top) and a cross-sectional view along line B-B' (bottom).

In FIG. 7, the upper drawing illustrates the mattress of the bed robot from below, showing that air circulators 257, 258, 259, and 260 are installed. The lower drawing is a cross-sectional view along line B-B' in the upper drawing, and it can be seen that air circulation holes 261, 262, 263, and 264 are vertically perforated in the mattress. The air circulators 257, 258, 259, and 260 perform a function of filtering air or/and a function of detecting and controlling temperature and humidity and also perform a function of collecting detected information and transmitting the collected information to a mobile device of a manager or protector in a wireless or wired communication manner using a communication network. In addition, when air is sprayed from the air circulators 257, 258, 259, and 260 through the air circulation holes 261, 262, 263, and 264, a frictional force between the porous flexible sheets 202, 204, 206, and 208 and the surface of the mattress 201 is reduced as much as possible to facilitate movement of a user.

Figure 8:
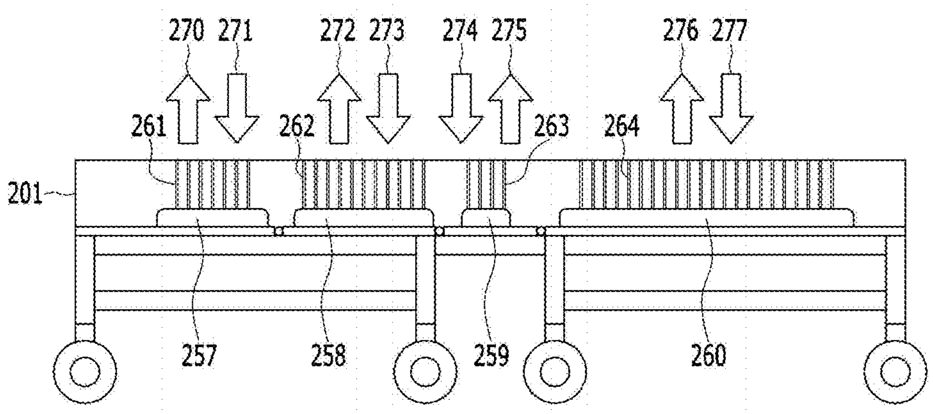
FIG. 8 is a right cross-sectional view along line B-B' in FIG. 7 which illustrates the bed robot.

FIG. 8 is a right-side cross-sectional view along line B-B' in FIG. 7 which illustrates the bed robot. A concept of vertically circulating air as indicated by arrows 270, 271, 272, 273, 274, 275, 276, and 277 is expressed. The air circulation serves to air the body of a lying user to prevent bedsores, and as just described, the air circulation also serves to reduce a frictional force with the surface of the mattress by slightly lifting the porous flexible sheet 202, 204, 206, and 208 on the mattress 201 upward. In order to lift the porous flexible sheets 202, 204, 206, and 208, a supply direction of air should be an upward direction indicated by the arrows 270, 272, 275, and 276.

Figure 9:
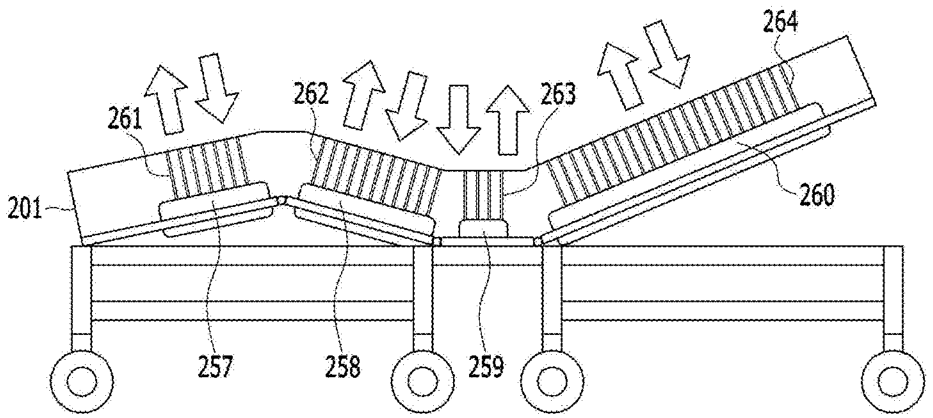
FIG. 9 is a right cross-sectional view in which a posture of a basic flat shape of the bed robot of FIG. 8 is transformed as shown in FIG. 4.

FIG. 9 is a right-side cross-sectional view in which a posture of a basic flat shape of the bed robot of FIG. 8 is transformed as shown in FIG. 4. While lying on the transformed mattress, a user can receive effects of preventing dampness on the skin, maintaining body temperature, and preventing bedsores from the circulating air as indicated by the arrows 270, 271, 272, 273, 274, 275, 276, and 277.

Figure 10:
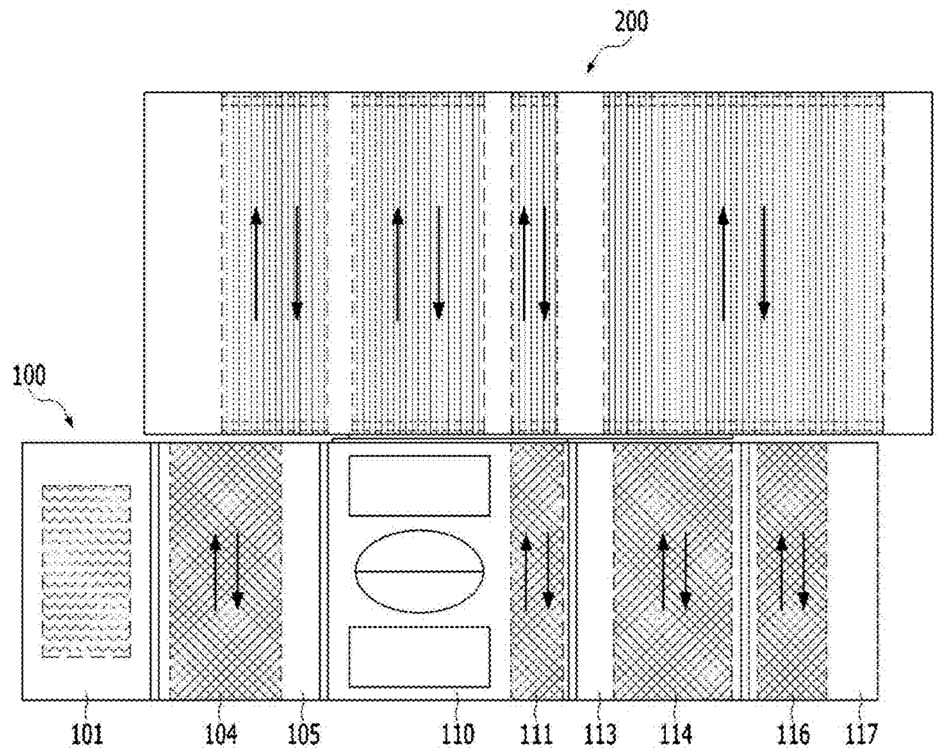
FIG. 10 is a plan view of a bed robot (top) and a plan view of an external transfer device (100) (bottom).

A shift function of a bed robot 200 will be described with reference to FIG. 10. The upper drawing in FIG. 10 is a plan view of the bed robot 200. The lower drawing is a plan view of a certain transfer device 100. FIG. 10 illustrates that two apparatuses are coupled at a middle part of a bed mattress and a middle part of the transfer device with which a hip of a user comes in contact.

For a brief description of the transfer device 100 in FIG. 10 for reference, from the left, divided upper plates including a first plate 101, a second plate 105, a third plate 110, a fourth plate 113, and a fifth plate 117 are connected to constitute one upper plate. A user lies on the one upper plate formed of all the divided upper plates and receives services dealing with a meal, transfer, defecation, bathing, etc. The first plate 101 is a part with which the feet of a user come in contact. The second plate 105 is a part with which the leg of a user come in contact, and for lateral movement of the user, a porous flexible sheet 104 made of a fiber or a fabric material through which air or water can pass is wound to move in a lateral direction (in an arrow direction) (that is, is installed in the lateral direction of the upper plate in the form of a roll). The third plate 110 is a part with which the thighs and hip of a user come in contact and has air holes and air circulation mechanisms for ventilation. A porous flexible sheet 111 for lateral movement of a user is also wound on the third plate 110 in the lateral direction. The fourth plate 113 is a part with which the back of a user comes in contact, and a porous flexible sheet 114 for lateral movement of a user is also wound thereon in the lateral direction. The fifth plate 117 is a part with which the head of a user comes in contact, and a porous flexible sheet 116 for lateral movement of a user is also wound thereon in the lateral direction. The porous flexible sheets 104, 111, 114, and 116 wound on the four divided upper plates in the lateral direction are provided to move in conjunction with each other in an upward direction indicated by arrows or a downward direction indicated by arrows in the same direction at almost the same speed.

Figure 11:
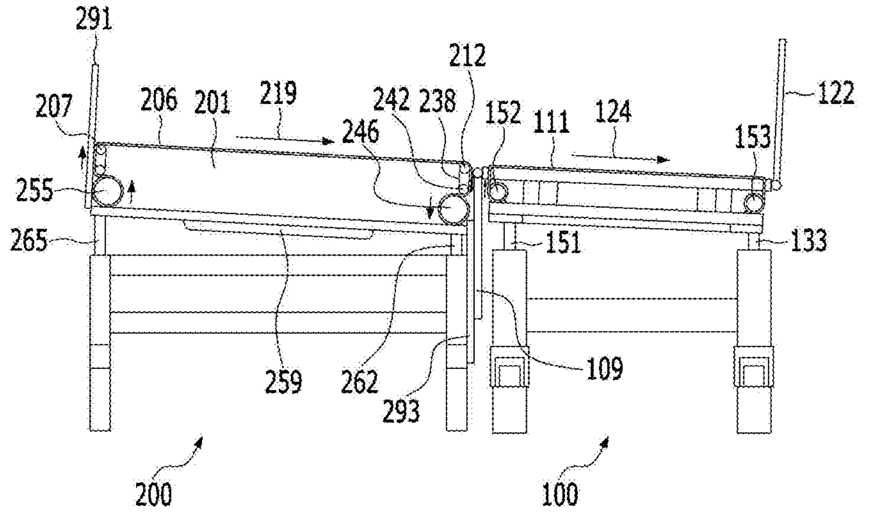
FIGS. 11 and 12 show front cross-sectional views after a bed robot (200) and the transfer device (100) are coupled.

FIG. 11 shows front cross-sectional views after the bed robot 200 and the transfer device 100 are coupled. FIG. 11 illustrates an operation of moving a user from the bed robot to the transfer device, with the cross-sectional view on the left illustrating the bed robot 200 and the cross-sectional view on the right illustrating the certain transfer device 100. Here, the transfer device may be an apparatus which shifts a user from the bed robot in the lateral direction to transfer the user to another place and may also be a transfer device for bathing assistance.

For the safety of a user, a left safety handrail 291 of the bed robot is erected, a right safety handrail 293 is lowered, a right safety handrail 122 of the transfer device is raised, and a left safety handrail 109 is lowered. In another embodiment, the right safety handrail 293 of the bed robot and the left safety handrail 109 of the transfer device may be electromagnetically coupled, and the bed robot and the transfer device may be implemented to perform wireless or wired communication.

First, in order to match a top height of the bed robot 200 with a top height of the transfer device 100, hydraulic cylinders 262 and 265 driven by electric motors may be provided in the bed robot to match heights of the bed robot and the transfer device to be leveled. After that, in order for a user to be smoothly shifted to the transfer device 100, a left hydraulic cylinder 265 of the bed robot is raised to give a gentle negative tilt in a movement direction of the user indicated by an arrow 219. Large rollers 255 and 246 on which a porous flexible sheet of the bed robot 200 is wound slowly rotate counterclockwise, and small rollers 207 and 212 on which the porous flexible sheet is placed rotate clockwise at the same speed as the large rollers 255 and 246. As a result, it is possible to shift the user in a lying state from the bed robot 200 to the transfer device 100 in the lateral direction.

Figure 12:
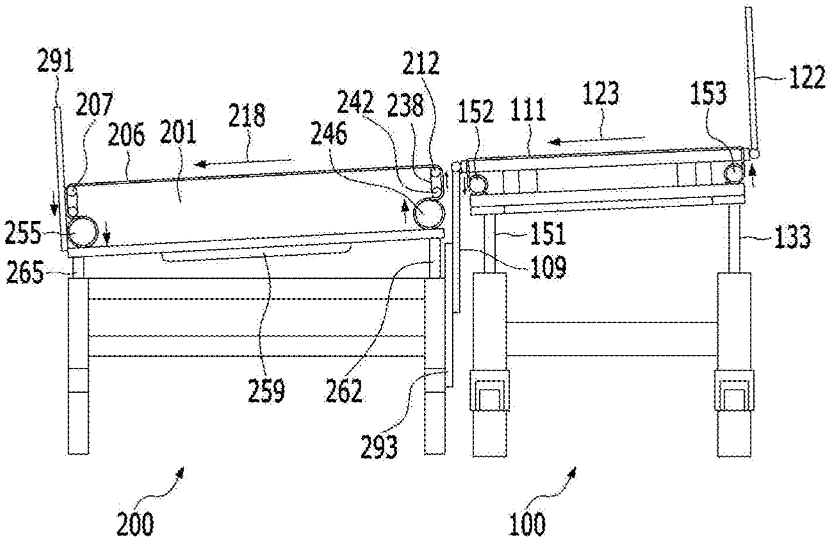

FIG. 12 shows front cross-sectional views after the bed robot 200 and the transfer device 100 are coupled. Unlike FIG. 11, FIG. 12 illustrates an operation of shifting a user from the transfer device 100 to the bed robot in the lateral direction, with the cross-sectional view on the left illustrating the bed robot 200 and the cross-sectional view on the right illustrating the certain transfer device 100. Similarly, for the safety of a user, the left safety handrail 291 of the bed robot is erected, the right safety handrail 293 is lowered, the right safety handrail 122 of the transfer device is raised, and the left safety handrail 109 is lowered. In another embodiment, the right safety handrail 293 of the bed robot and the left safety handrail 109 of the transfer device may be electromagnetically coupled, and the bed robot and the transfer device may be implemented to perform wireless or wired communication.

First, in order to match a top of the bed robot with a top height of the transfer device, the hydraulic cylinders 262 and 265 driven by the electric motors may be provided in the bed robot 200 to match heights of the bed robot and the transfer device to be leveled. In addition, in order for a user to be smoothly shifted from the transfer device 100, the right hydraulic cylinder 262 of the bed robot is raised to give a gentle positive tilt in a movement direction of the user indicated by an arrow 218. The large rollers 255 and 246 on which the porous flexible sheet of the bed robot 200 is wound slowly rotate clockwise, and the small rollers 207 and 212 on which the porous flexible sheet is placed rotate counterclockwise at the same speed as the large rollers 255 and 246. As a result, it is possible to shift the user in a lying state from the transfer device 100 to the bed robot 200 in the lateral direction.

<Autonomous Execution Scenario of Bed Robot>

Figure 13:
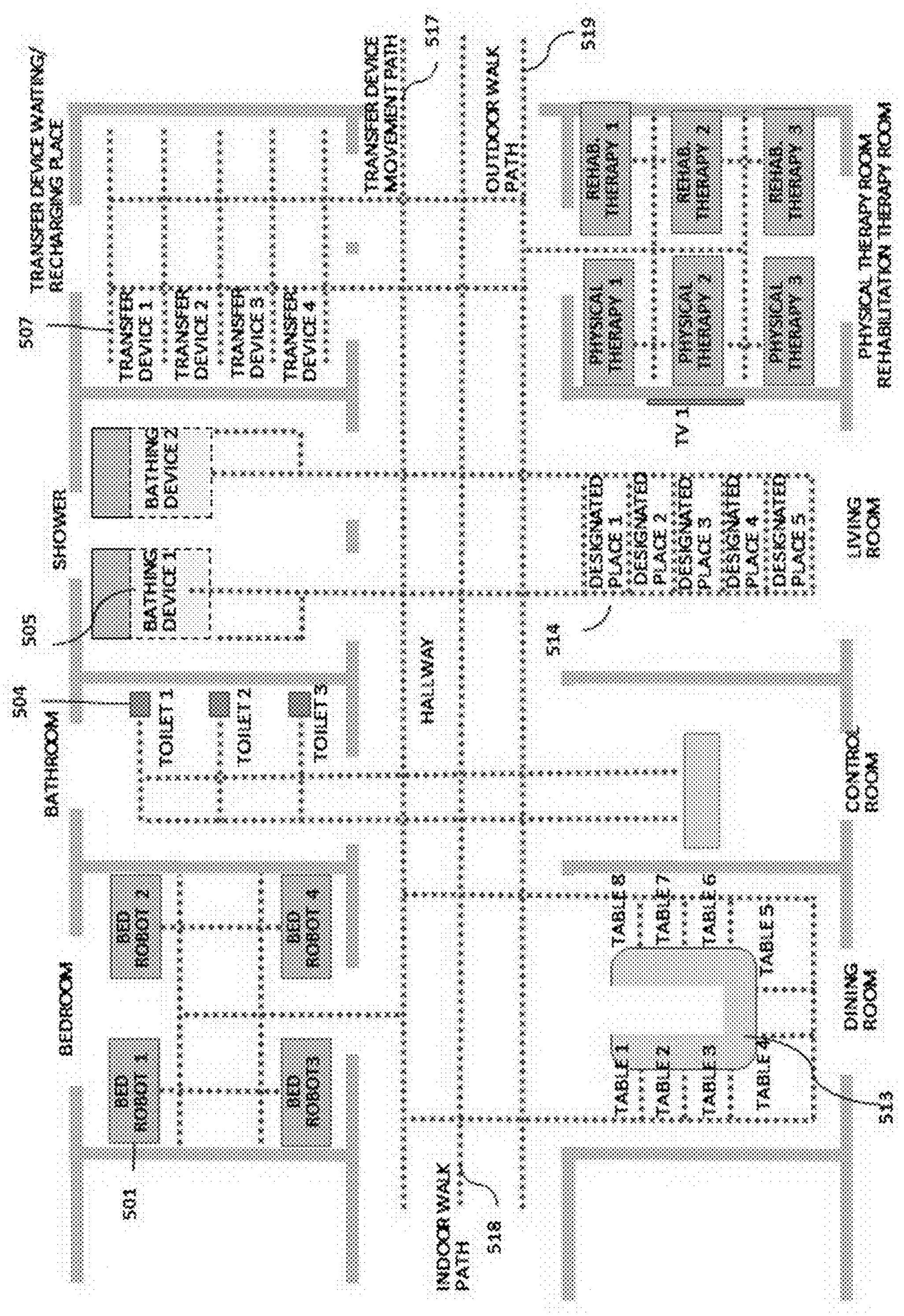
FIG. 13 is an exemplary view of a scenario in which a bed robot autonomously performs functions according to the present invention.

FIG. 13 is an exemplary view of a scenario in which a bed robot autonomously performs functions according to the present invention. The bed robot may cooperate with a bathing device (robot), a transfer device (robot), or the like for autonomous execution.

When a user wants to be transferred to another place (a bathroom, a shower, a living room, a dining room, a physical therapy room, or the like), a bed robot-1 501 in the bedroom calls an waiting transfer device-1 507 (in a wired/wireless communication manner), and the transfer device-1 507 moves along a transfer device movement path 517 using an electromagnetic device capable of reading the movement path 517 of the transfer device having an electromagnetic function. The transfer device-1 507 arrives at the bed robot-1 501 in the bedroom to be coupled to the bed robot-1 501. Through mutual cooperation, the user is shifted from the bed robot-1501 to the transfer device-1507, and the transfer device-1507 is separated from the bed robot-1 501. When the user wants to go to the dining room, the transfer device-1 507 carrying the user transfers the user to a table-1 513 of the dining room. When the user wants to watch television (TV) after eating, the transfer device-1 507 carrying the user moves to a designated place-1 514 in the living room. When the user wants physical therapy, while carrying the user, the transfer device-1 507 moves to the physical therapy room, and when the user wants rehabilitation therapy, while carrying the user, the transfer device-1 507 moves to the rehabilitation therapy room. When the user wants to go around in a building (or indoors), the transfer device-1 507 takes an indoor move along an indoor walk path 518, and when the user wants to take a walk outside, the transfer device-1 507 takes an outdoor move along an outdoor walk path 519. When the user wants to return to the bed robot-1 501 in the bedroom, while carrying the user, the transfer device-1 507 moves to the bedroom to be coupled to the bed robot-1 501 and shifts the user to the bed robot-1 501 to put the user down. Then, the transfer device-1 507 is separated from the bed robot-1 501. The transfer device-1, on which the user is shifted to be carried, transfers the user to the bathroom or shower. When defecation or bathing is completed, the user is transferred to the bed robot-1 501 in the bedroom by the transfer device-1 507.

<Software Algorithm for Autonomous Execution>

Figure 14:
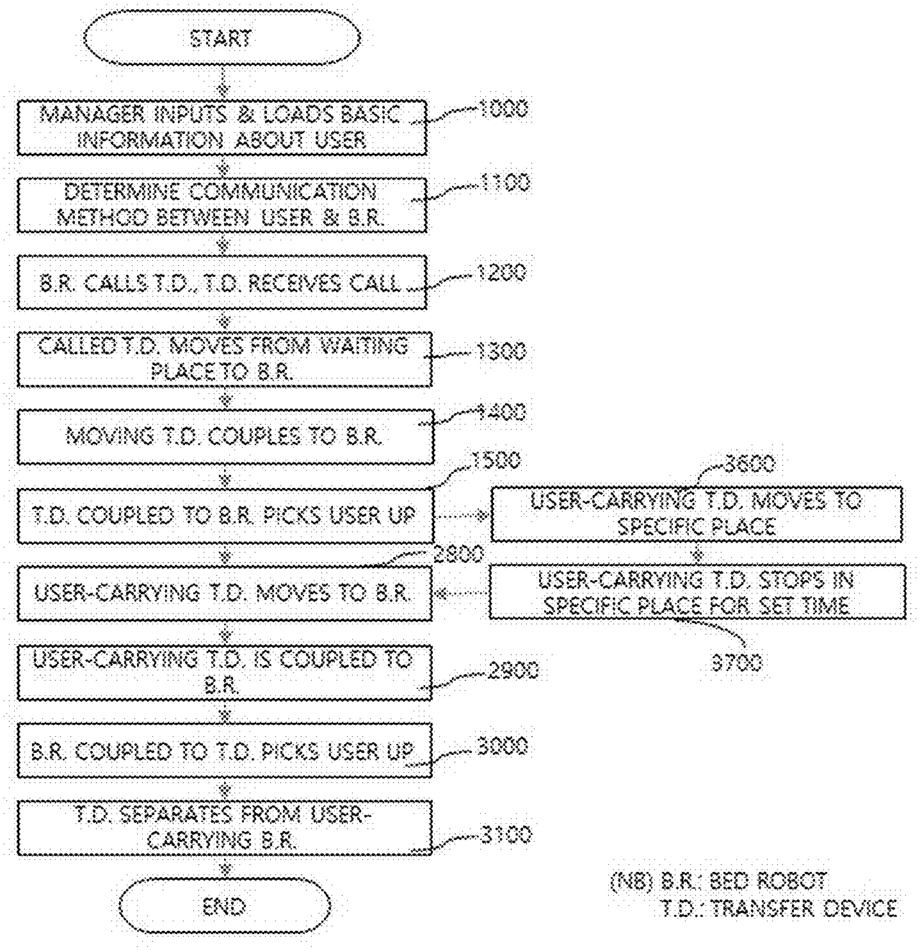
FIGS. 14 to 26 are flowcharts of a software program that performs a function and control of a bed robot of the present invention.
Figure 15:
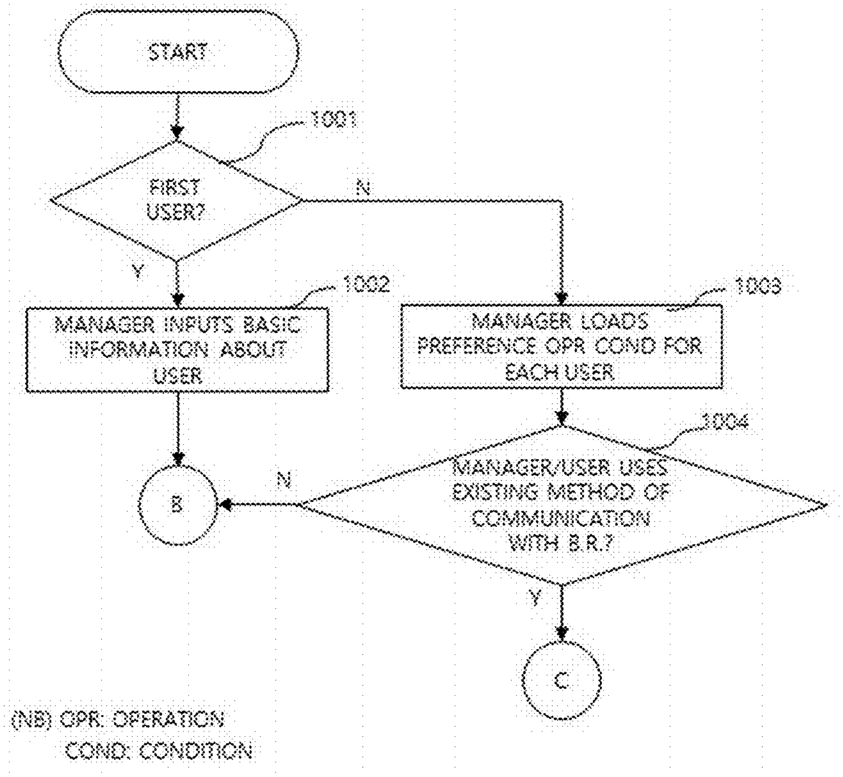
Figure 16:
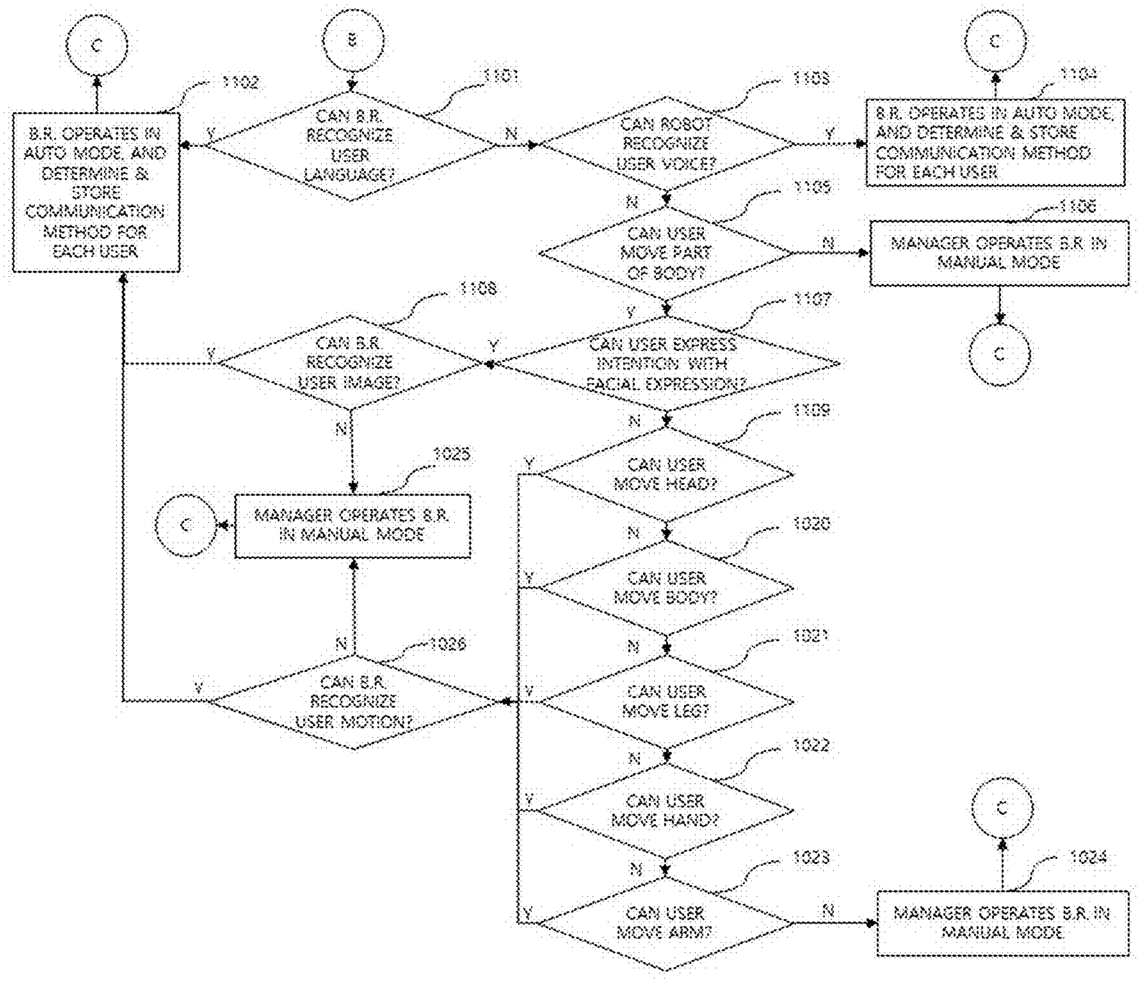
Figure 17:
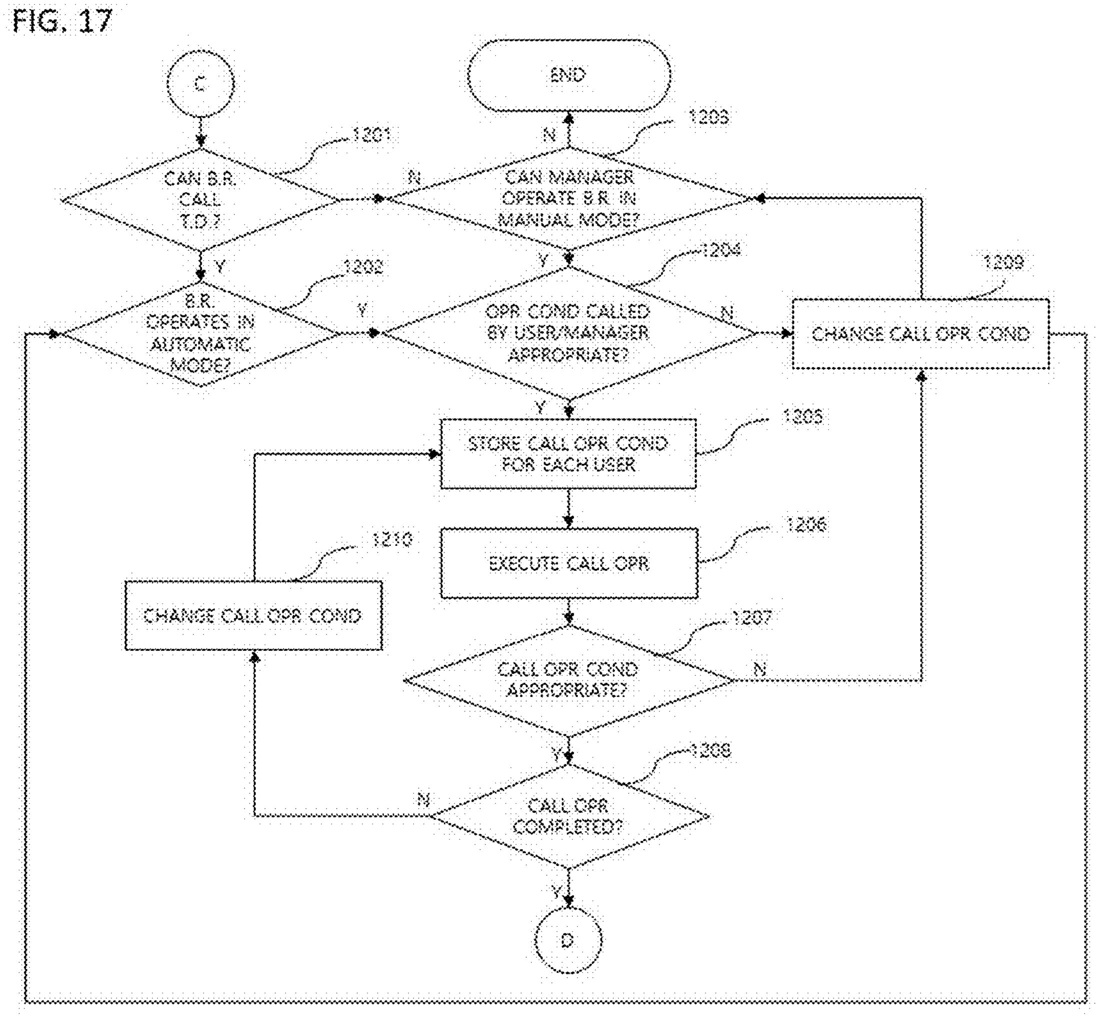
Figure 18:
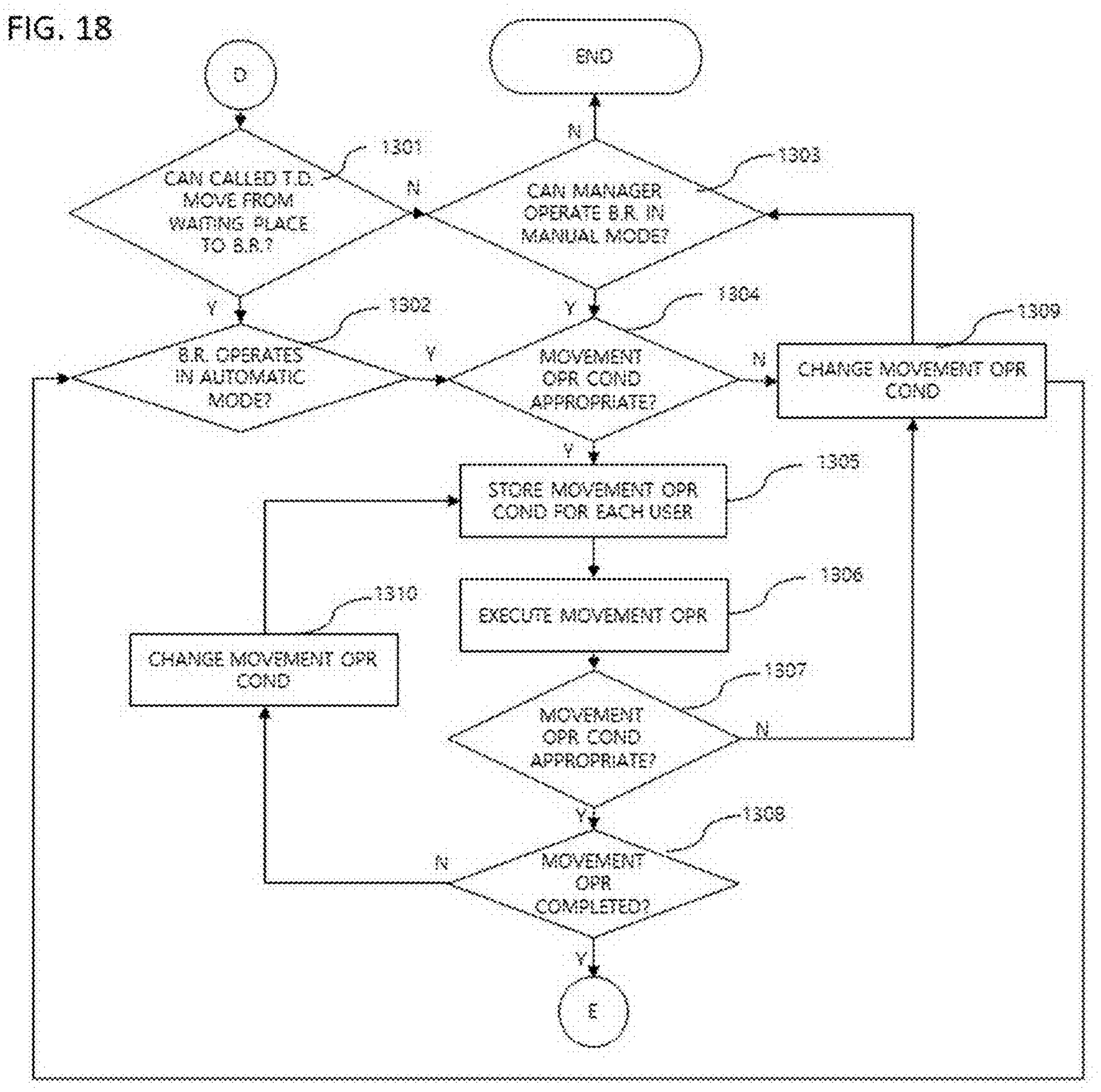
Figure 19:
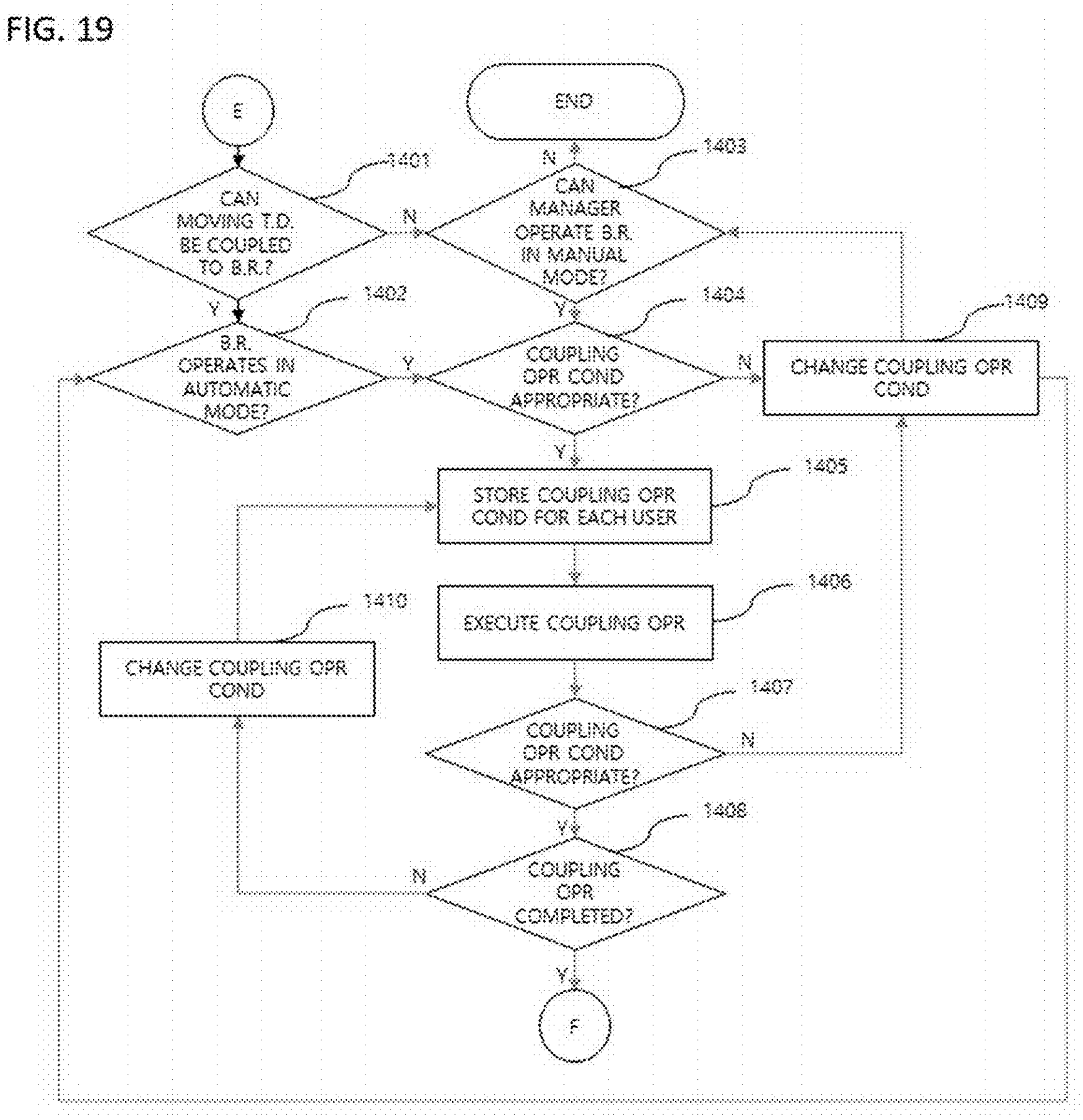
Figure 20:
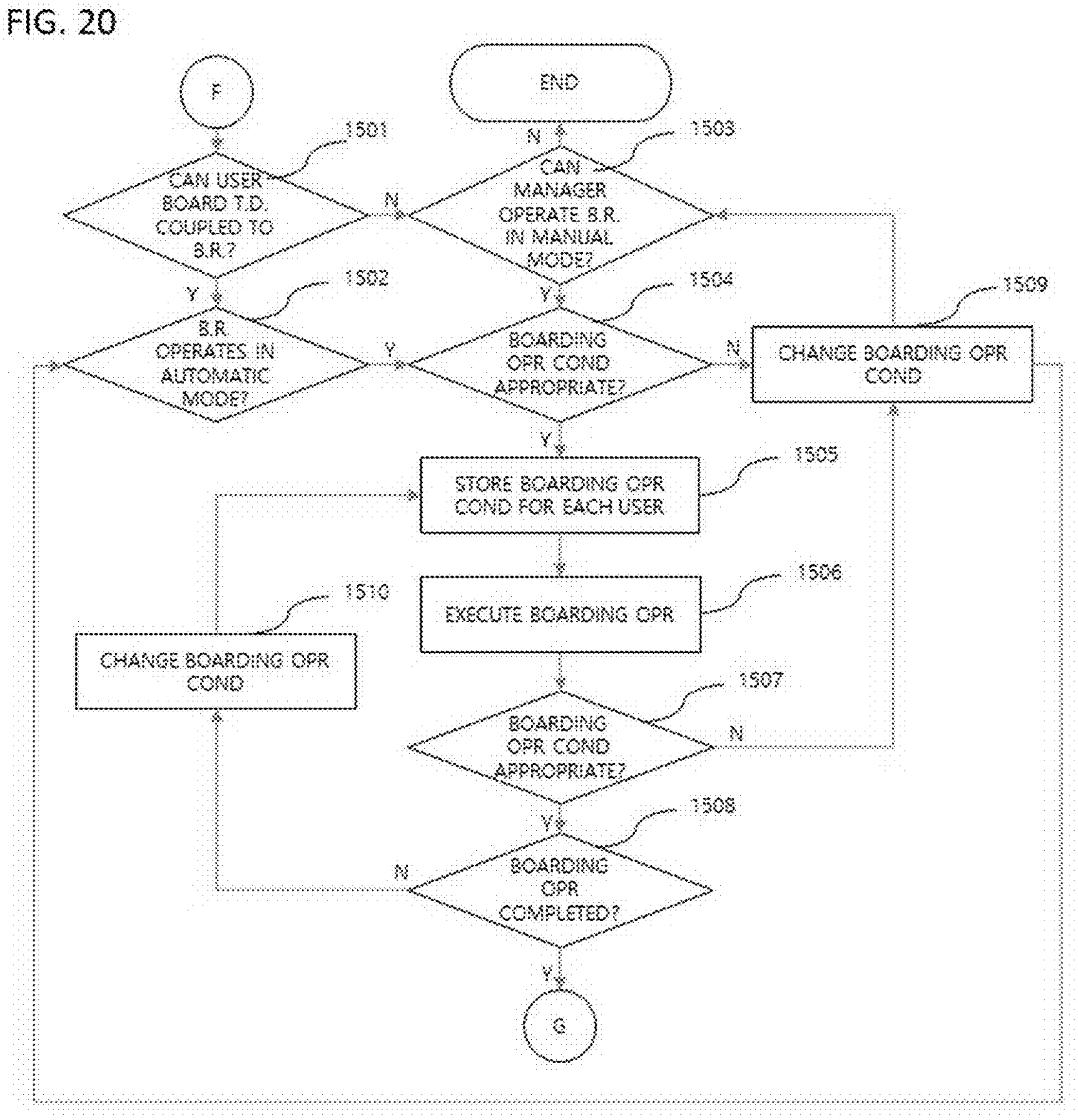
Figure 21:
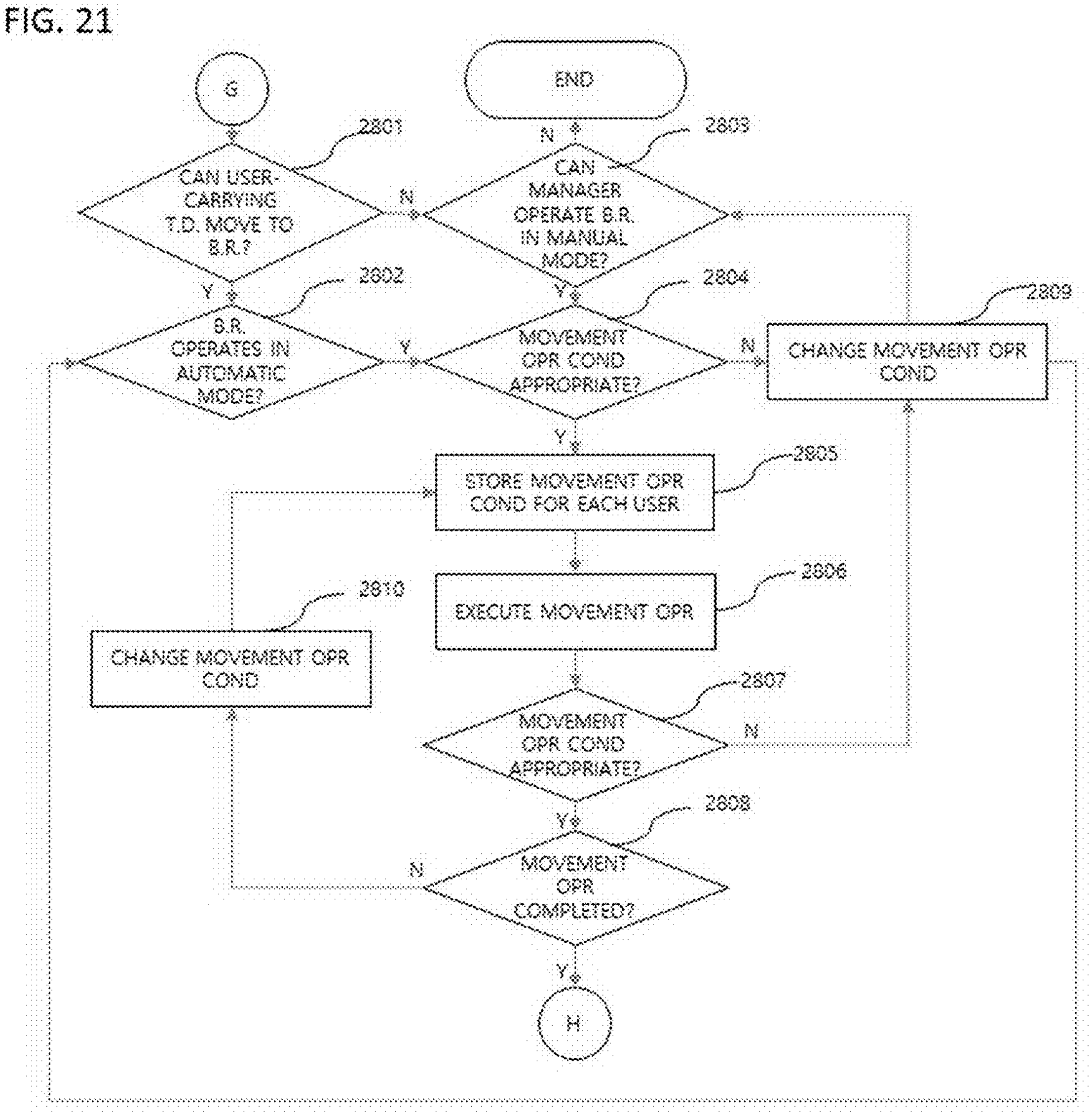
Figure 22:
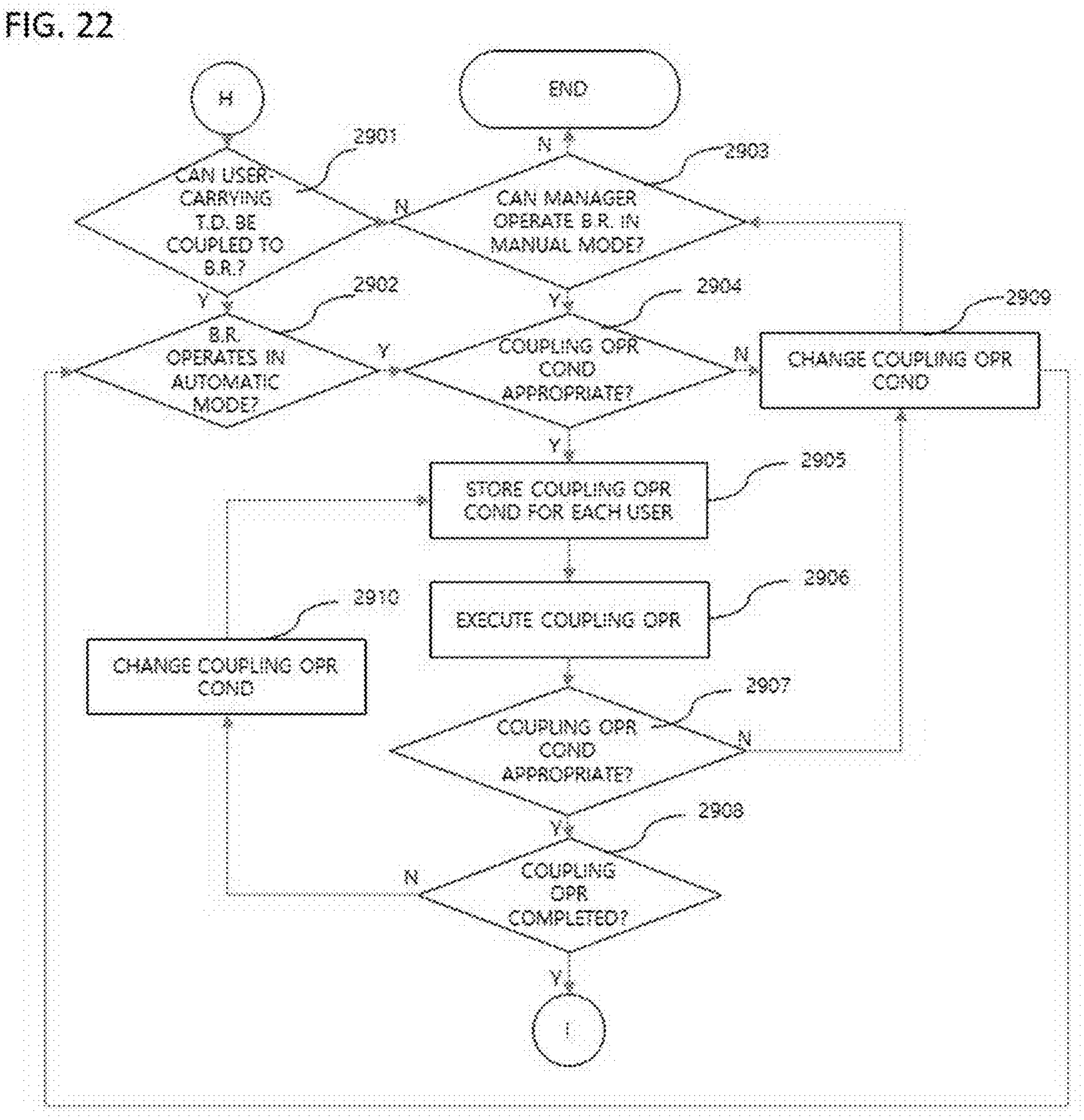
Figure 23:
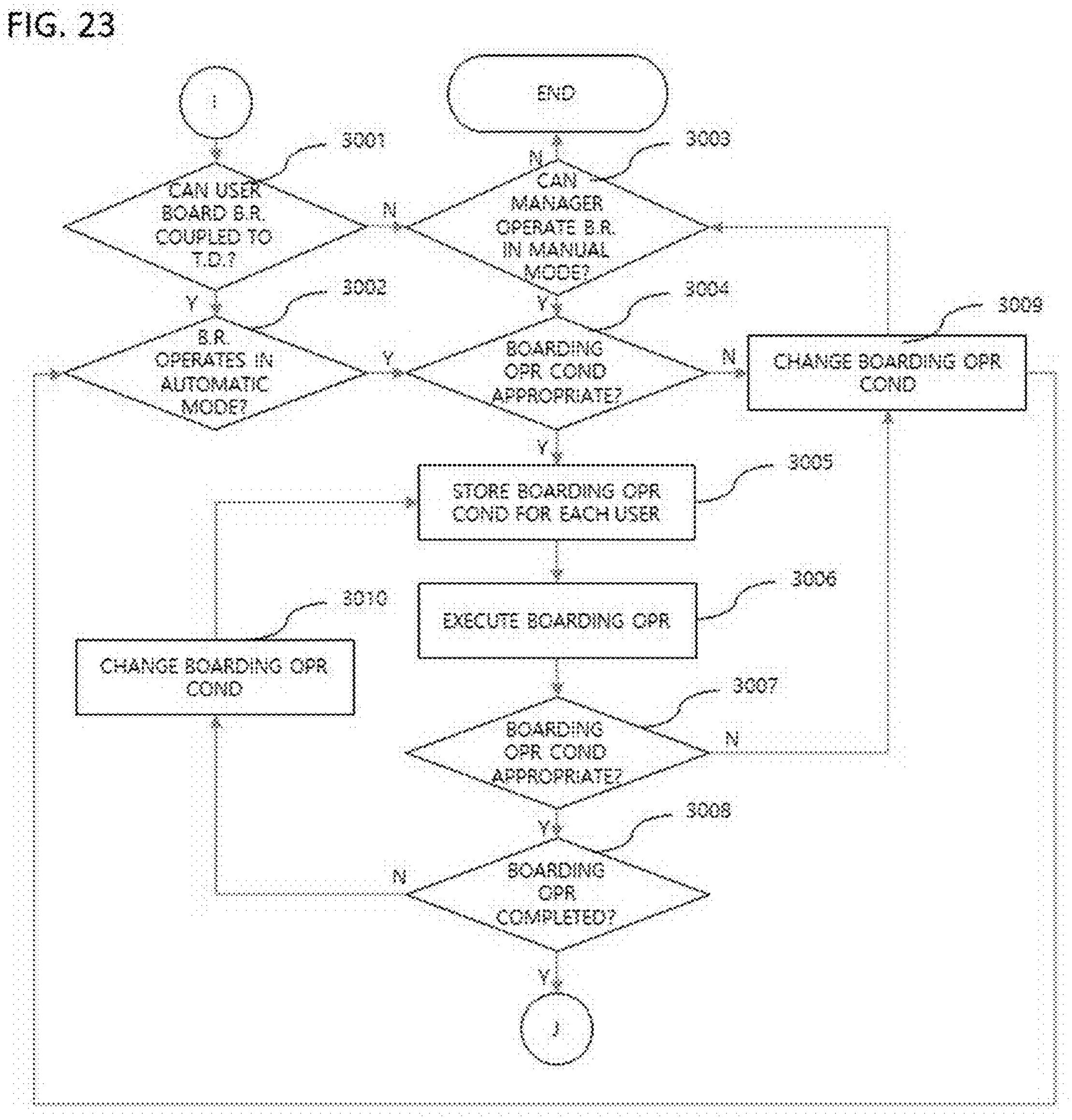
Figure 24:
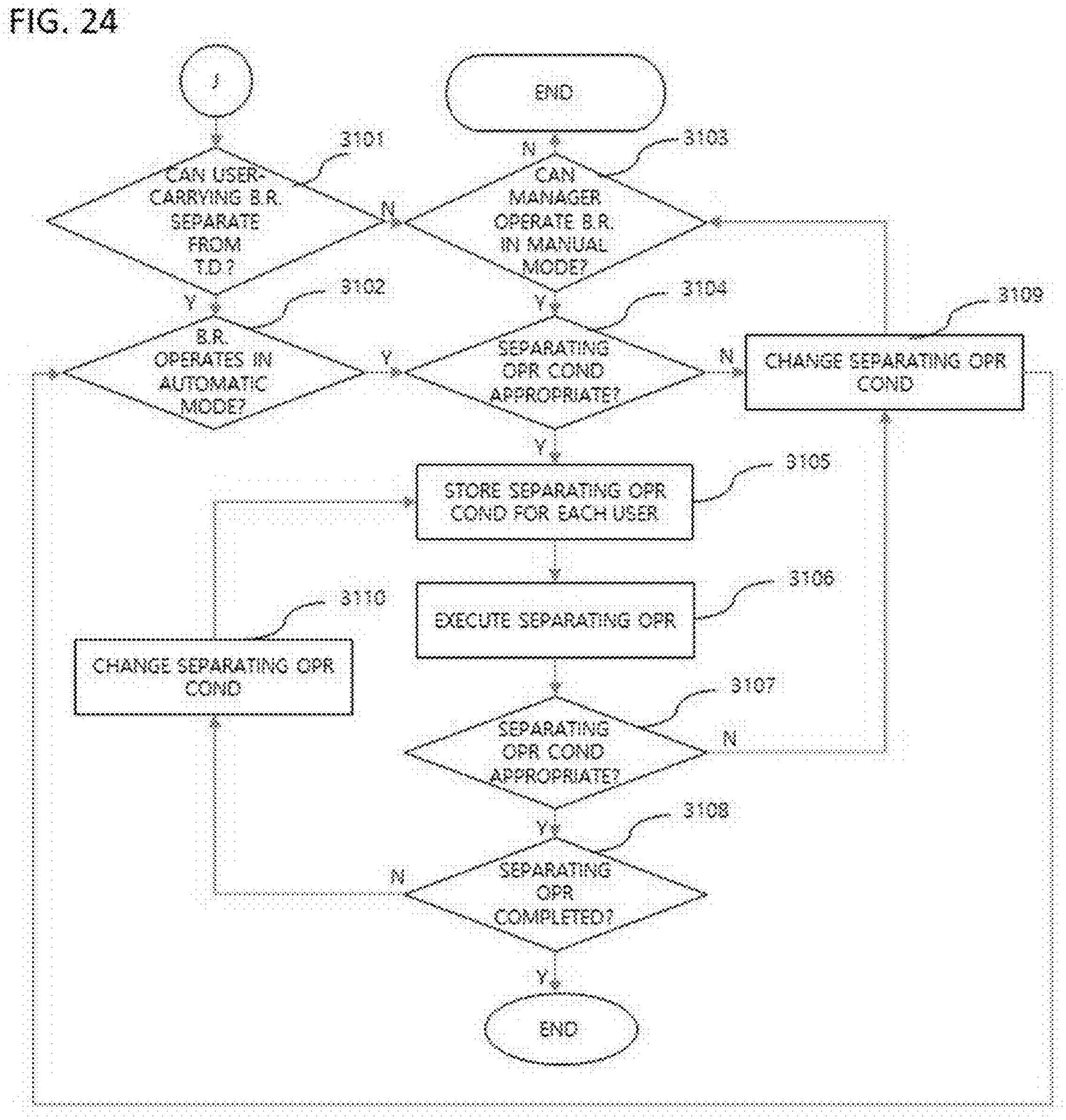
Figure 25:
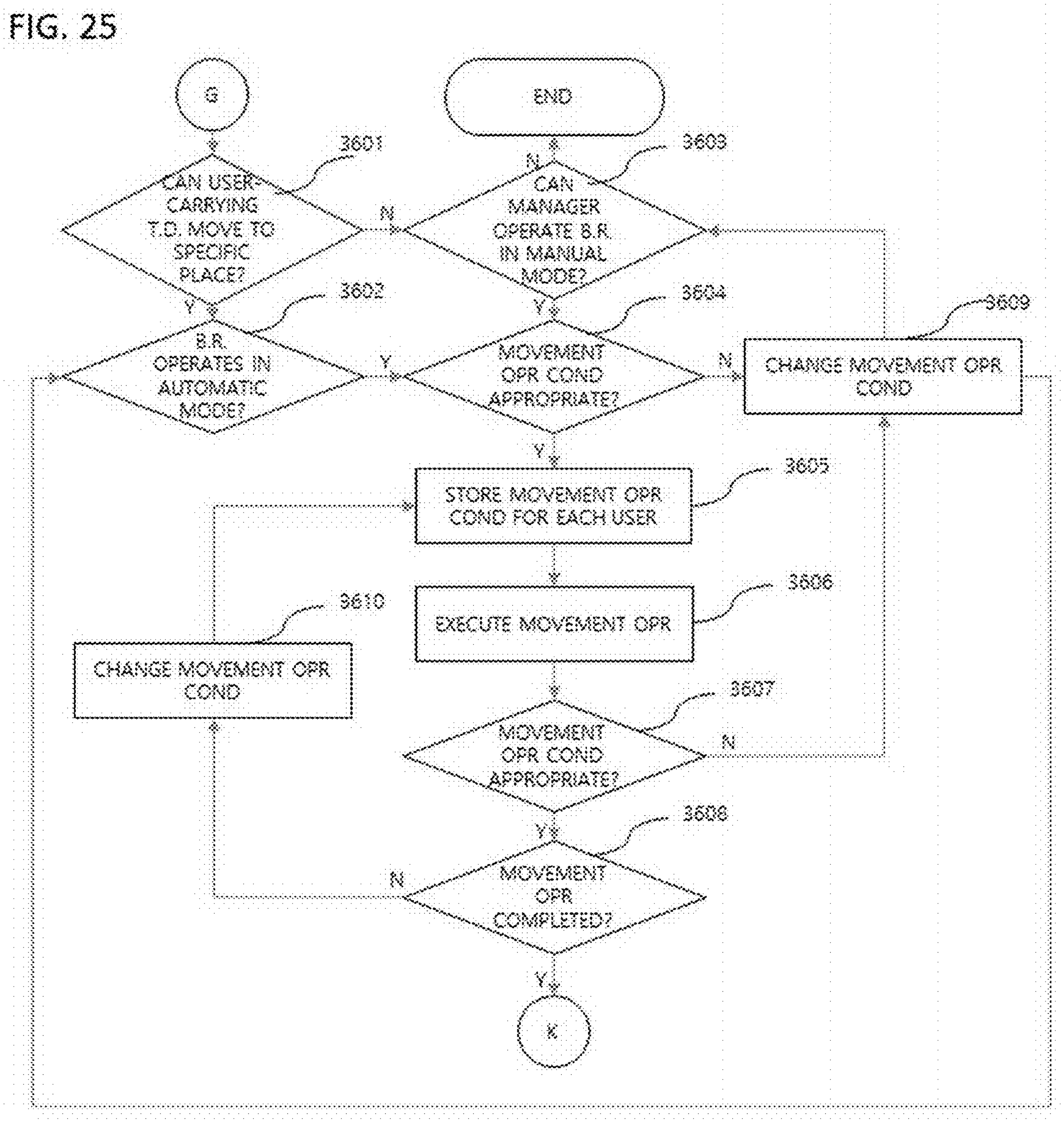
Figure 26:
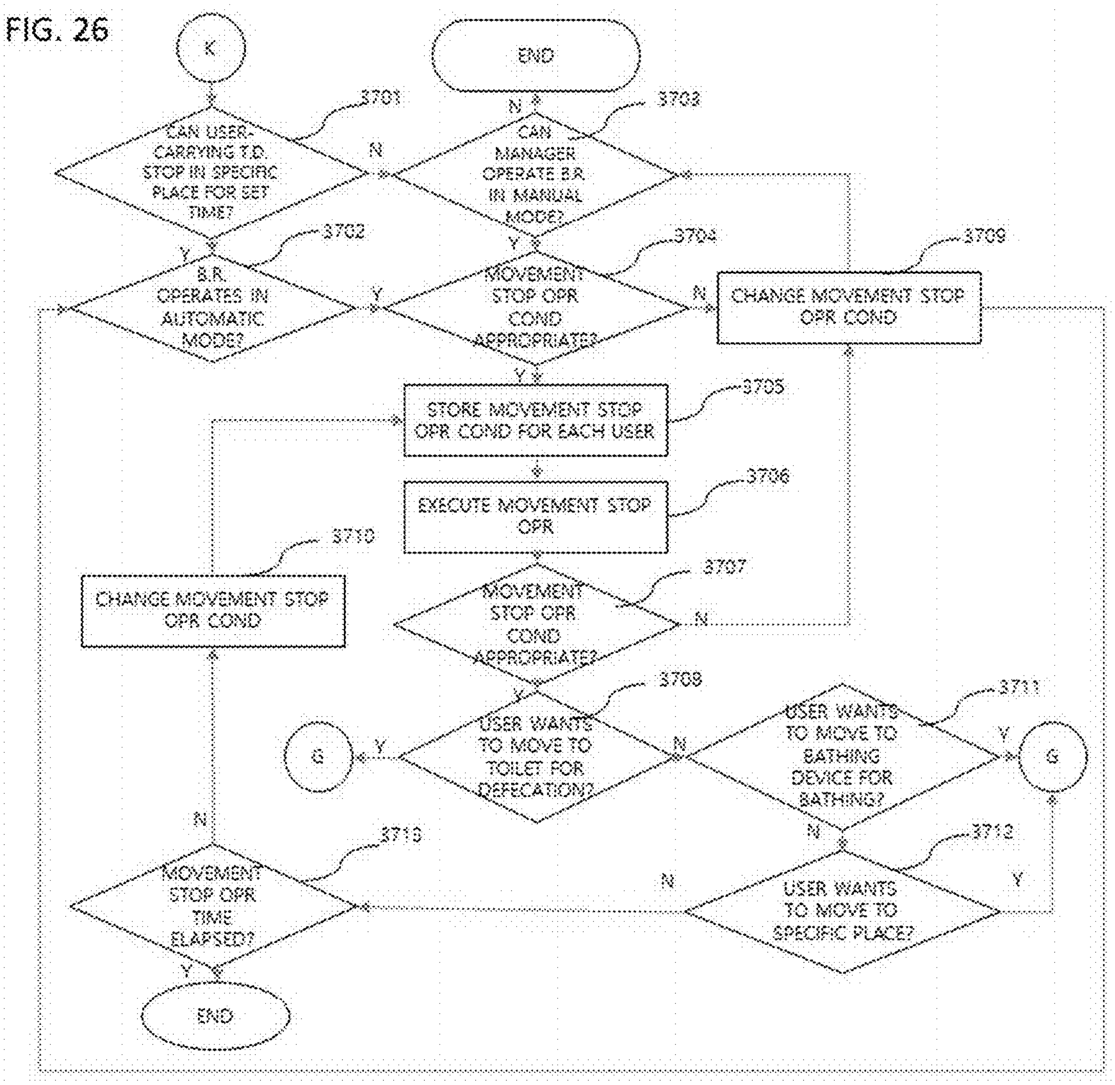

A bed robot of the present invention can operate fully autonomously using artificial intelligence and automatic control technology. From the viewpoint of such an autonomous execution robot, the function and control of the bed robot of the present invention are described through a software program with reference to drawings subsequent to FIG. 14. FIG. 14 is a schematic diagram of a software program to be included in the bed robot. FIG. 15 and subsequent drawings illustrate detailed routines for each processing procedure in an outline of the program of FIG. 14. A routine in which the bed robot of the present invention interacts with other external devices, for example, other bed robots, transfer devices, and bathing devices, to perform autonomous functions is described. Autonomous functions of the bed robot of the present invention described above can be easily implemented by those skilled in the art with reference to flowcharts of the software program of FIGS. 14 to 26.

The function or process of each component of the bed robot according to the present invention can be implemented with a hardware element including at least one of a digital signal processor (DSP), a processor, a controller, an application-specific integrated circuit (ASIC), a programmable logic device (FPGA or the like), and other electronic devices, and a combination thereof. In addition, the function or process of each component of the bed robot can be implemented with software combined with hardware elements or independently, and the software can be stored in a recording medium.

Although the present invention has been described with reference to exemplary embodiments of the present invention, it will be understood by those skilled in the art to which the present invention pertains that the present invention can be carried out in specific forms other than those disclosed herein without changing the technical spirits and essential features thereof. Therefore, it should be understood that the embodiments described herein are illustrative and not restrictive in all aspects. The scope of the present invention is defined by the scope of the attached claims, rather than the detailed description. It should be appreciated that all variations and modifications derived from the scope of the claims and the equivalent concepts thereof are included in the scope of the present invention.

The invention claimed is:

1. A bed robot apparatus comprising:

a mattress partitioned in a longitudinal direction to correspond to a longitudinal position of an object;

a porous flexible sheet which reciprocates in a lateral direction on an upper surface of the mattress for each partitioned part;

inlet and outlet ports formed in side surfaces of the mattress for each partitioned part such that the porous flexible sheet exits from a first side of the mattress, passes over the upper surface of the mattress, and enters a second side opposite to the first side;

a plurality of electrically driven first rollers on which the porous flexible sheet is wound and which rotate in a first direction;

a plurality of second rollers attached to the mattress from one or more side surfaces of the mattress, the plurality of second rollers coupled to the plurality of electrically driven first rollers and driven by the rotation of the plurality of electrically driven first rollers in a second direction opposite the first direction, wherein the porous flexible sheet is placed over the plurality of second rollers; and an air circulator disposed under the mattress and configured to spray air through a plurality of air circulation holes vertically perforated in the mattress to reduce a frictional force between the porous flexible sheet and the upper surface of the mattress and to supply ventilation air to the object on the mattress, wherein the air circulator sprays air through the plurality of air circulation holes when the plurality of electrically driven first rollers rotate in the first direction and the plurality of second rollers are driven in the second direction.

2. The bed robot apparatus of claim 1, further comprising a pivot mechanism transforms a shape of the mattress.

3. The robot bed apparatus of claim 1, wherein the mattress includes at least one of an odor sensor, a temperature sensor, and a humidity sensor.

4. The bed robot apparatus of claim 1, further comprising a part configured to detect and adjust temperature and humidity and transmit detected temperature and humidity information.

5. The robot bed apparatus of claim 1, further comprising a part configured to adjust at least one of a height, a lateral tilt, and a longitudinal tilt of the mattress.

6. The bed robot apparatus of claim 1, further comprising a part configured to communicate with an external environment.

7. The bed robot apparatus of claim 1, further comprising an autonomous execution unit configured to autonomously execute the mattress and the porous flexible sheet.

* * * * *